United States Patent
Peng et al.

(10) Patent No.: US 10,599,670 B2
(45) Date of Patent: Mar. 24, 2020

(54) PERFORMANCE ESTIMATION SYSTEM UTILIZING A DATA ANALYTICS PREDICTIVE MODEL

(71) Applicant: Hartford Fire Insurance Company, Hartford, CT (US)

(72) Inventors: Jufeng Peng, Avon, CT (US); Gregory Patrick Larsson, Brooklyn, NY (US); Michael F Kosednar, Overland Park, KS (US); Anne S Gouin, Portland, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 1016 days.

(21) Appl. No.: 15/098,074

(22) Filed: Apr. 13, 2016

(65) Prior Publication Data

US 2017/0300824 A1 Oct. 19, 2017

(51) Int. Cl.
*G06F 16/26* (2019.01)
*G06F 11/34* (2006.01)
*G06F 11/32* (2006.01)

(52) U.S. Cl.
CPC .......... *G06F 16/26* (2019.01); *G06F 11/3409* (2013.01); *G06F 11/3447* (2013.01); *G06F 11/32* (2013.01)

(58) Field of Classification Search
CPC .............................. G06F 16/26; G06F 11/3447
See application file for complete search history.

(56) References Cited

U.S. PATENT DOCUMENTS

| | | | |
|---|---|---|---|
| 7,409,357 | B2 | 8/2008 | Schaf et al. |
| 8,260,638 | B2 | 9/2012 | McNamee et al. |
| 8,666,786 | B1 | 3/2014 | Wirz et al. |
| 2008/0126139 | A1* | 5/2008 | Prendergast ........... G06Q 40/00 705/4 |

(Continued)

OTHER PUBLICATIONS

Antonio, Katrien & Beirlant, Jan, "Actuarial Statistics With Generalized Linear Mixed Models", Insurance: Mathematics and Economics 40 (2007) 58-76. (Year: 2007).*

(Continued)

*Primary Examiner* — Scott A. Waldron
(74) *Attorney, Agent, or Firm* — Buckley, Maschoff & Talwalkar LLC

(57) ABSTRACT

According to some embodiments, a server may access a data store containing electronic records, each electronic record representing a risk association for an entity in connection with a plurality of relationships, and each electronic record may contain a set of record characteristic values. The server may automatically designate a first sub-set of the set of record characteristic values as fixed effect variables and a second sub-set as random effect variables. A data analytics mixed effect predictive model may then generate, based on the fixed and random effect variables, a future performance estimation value for the risk association of each entity in connection with its plurality of relationships. An indication associated with the future performance estimation value for the risk association of at least one entity in connection with its plurality of relationships may then be transmitted to generate an interactive user interface display.

19 Claims, 13 Drawing Sheets

(56) References Cited

U.S. PATENT DOCUMENTS

2015/0100353 A1    4/2015    Hughes et al.

OTHER PUBLICATIONS

Quene, Hugo & van den Bergh, Huub, "Examples of mixed-effects modeling with crossed random effects and with binomial data", Journal of Memory and Language 59 (2008), pp. 413-425. (Year: 2008).*

Maldonado, Lizmarie Gabriela, "Linear Mixed-Effects Models: Applications to the Behavioral Sciences and Adolescent Community Health", Thesis, Jan. 2012. (Year: 2012).*

* cited by examiner

| ELECTRONIC RECORD IDENTIFIER 902 | COMMUNICATION ADDRESS 904 | VALUES FOR FIXED EFFECT VARIABLES 906 | VALUES FOR RANDOM EFFECT VARIABLES 908 | FUTURE PERFORMANCE ESTIMATION VALUES 910 | STATUS 912 |
|---|---|---|---|---|---|
| ER_1001 | 55 WEST AVE – ROOM 5 SAN JOSE, CA | A | D | X | DENIED |
| ER_1002 | 123 MAIN STREET HARTFORD, CT | B | E | Y | ADJUSTED |
| ER_1003 | (555) 555-5555 | C | F | Z | ISSUED |

PERFORMANCE ESTIMATION SYSTEM UTILIZING A DATA ANALYTICS PREDICTIVE MODEL

BACKGROUND

Electronic records, such as files and database entries, may be stored and utilized by an enterprise. Moreover, an enterprise may be interested in analyzing information about each electronic record to predict a future performance estimation value that might be associated with that particular record. For example, the enterprise might want to predict future performance estimation values to help optimize certain parameters and/or to identify electronic records that may need to be adjusted. Manually analyzing a batch of electronic records, however, can be a time consuming and error prone process—especially where there are a substantial number of records to be analyzed (e.g., thousands of electronic records might need to be reviewed) and/or there are a lot of factors that could potentially influence predictions of future performance estimation values.

It would be desirable to provide systems and methods to automatically provide a future performance estimation assessment tool that generates faster, more accurate future performance estimation values and allows for flexibility and effectiveness when responding to those values.

SUMMARY OF THE INVENTION

According to some embodiments, systems, methods, apparatus, computer program code and means provide a future performance estimation assessment tool. In some embodiments, a server may access a data store containing electronic records, each electronic record representing a risk association for an entity in connection with a plurality of relationships, and each electronic record may contain a set of record characteristic values. The server may automatically designate a first sub-set of the set of record characteristic values as fixed effect variables and a second sub-set as random effect variables. A data analytics mixed effect predictive model may then generate, based on the fixed and random effect variables, a future performance estimation value for the risk association of each entity in connection with its plurality of relationships. An indication associated with the future performance estimation value for the risk association of at least one entity in connection with its plurality of relationships may then be transmitted to generate an interactive user interface display.

Some embodiments comprise: means for accessing, by an automated back-end application computer server, a data store containing electronic records, each electronic record representing a risk association for an entity in connection with a plurality of relationships, wherein each electronic record contains a set of record characteristic values; means for automatically designating, by the back-end application computer server, a first sub-set of the set of record characteristic values as fixed effect variables; means for automatically designating, by the back-end application computer server, a second sub-set of the set of record characteristic values as random effect variables; means for generating, by a data analytics mixed effect predictive model based on the fixed effect variables and the random effect variables, a future performance estimation value for the risk association of each entity in connection with its plurality of relationships; and means for transmitting an indication associated with the future performance estimation value for the risk association of at least one entity in connection with its plurality of relationships to generate an interactive user interface display, wherein said transmitting is performed by a communication port, coupled to the back-end application computer server, that facilitates an exchange of electronic messages, via a distributed communication network, supporting the interactive user interface display.

In some embodiments, a communication device associated with a back-end application computer server exchanges information with remote devices. The information may be exchanged, for example, via public and/or proprietary communication networks.

A technical effect of some embodiments of the invention are improved and computerized ways to provide a future performance estimation assessment tool that generates faster, more accurate future performance estimation values and allows for flexibility and effectiveness when responding to those values. With these and other advantages and features that will become hereinafter apparent, a more complete understanding of the nature of the invention can be obtained by referring to the following detailed description and to the drawings appended hereto.

BRIEF DESCRIPTION OF THE DRAWINGS

FIG. 9 is a portion of a tabular future performance database in accordance with some embodiments.

DETAILED DESCRIPTION

The present invention provides significant technical improvements to facilitate electronic messaging and dynamic data processing. The present invention is directed to more than merely a computer implementation of a routine or conventional activity previously known in the industry as it significantly advances the technical efficiency, access and/or accuracy of communications between devices by implementing a specific new method and system as defined herein. The present invention is a specific advancement in the area of electronic record analysis by providing benefits in data accuracy, data availability, and data integrity and such advances are not merely a longstanding commercial practice. The present invention provides improvement beyond a mere generic computer implementation as it involves the processing and conversion of significant amounts of data in a new beneficial manner as well as the interaction of a variety of specialized client and/or third party systems, networks, and subsystems. For example, in the present invention information may be transmitted to remote devices from a back-end application server and results may then be analyzed accurately to evaluate future performance values associated with various electronic records, thus improving the overall performance of the system associated with message storage requirements and/or bandwidth considerations (e.g., by reducing the number of messages that need to be transmitted via a network). Moreover, embodiments associated with automatic predictions might further improve communication network performance, user interactions, real time chat or telephone call center responsiveness, etc.

Electronic records, such as files and database entries, may be stored and utilized by an enterprise. Moreover, an enterprise may be interested in analyzing information about each electronic record to predict a future performance estimation value that might be associated with that particular record. For example, the enterprise might want to predict future performance estimation values to help optimize certain parameters and/or to identify electronic records that may need to be adjusted. Manually analyzing a batch of electronic records, however, can be a time consuming and error prone process—especially where there are a substantial number of records to be analyzed (e.g., thousands of electronic records might need to be reviewed) and/or there are a lot of factors that could potentially influence predictions of future performance estimation values.

Figure 1:
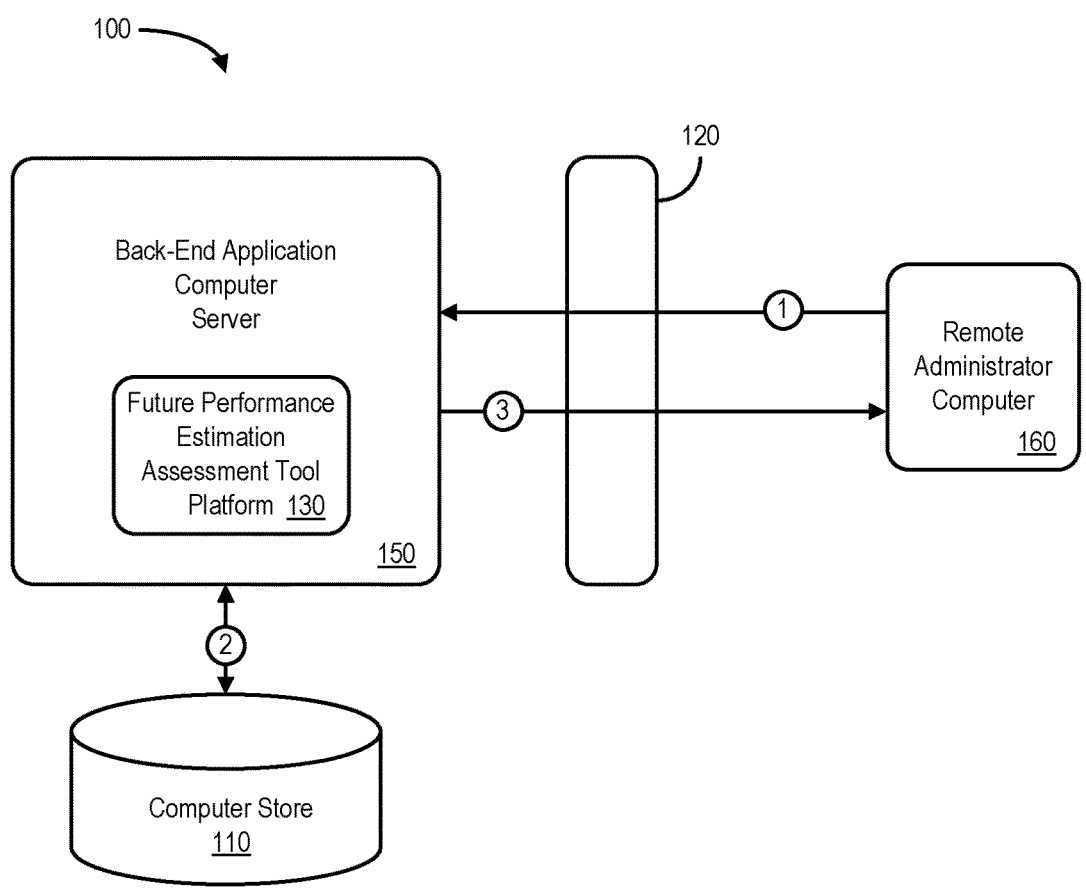
FIG. 1 is a high-level block diagram of a system according to some embodiments.

It would be desirable to provide systems and methods to provide a future performance estimation assessment tool that generates faster, more accurate future performance estimation values and allows for flexibility and effectiveness when responding to those values. FIG. 1 is a high-level block diagram of a system 100 according to some embodiments of the present invention. In particular, the system 100 includes a back-end application computer server 150 that may access information in a computer store 110 (e.g., storing a set of electronic records representing risk associations, each record including one or more communication addresses, attribute variables, record characteristic values, etc.). The back-end application computer server 150 may also exchange information with a remote administrator computer 160 (e.g., via a firewall 120). According to some embodiments, a future performance estimation assessment tool platform 130 of the back-end application computer server 150 may facilitate a prediction of a future performance estimation value for an electronic record and/or the display of results via one or more remote administrator computers 160. Note that embodiments may be associated with periodic (or asynchronous) types of scheduling. Further note that the back-end application computer server 150 might be associated with a third party, such as a vendor that performs a service for an enterprise.

The back-end application computer server 150 might be, for example, associated with a Personal Computer ("PC"), laptop computer, smartphone, an enterprise server, a server farm, and/or a database or similar storage devices. According to some embodiments, an "automated" back-end application computer server 150 may facilitate a prediction of a future performance estimation value for electronic records in the computer store 110. As used herein, the term "automated" may refer to, for example, actions that can be performed with little (or no) intervention by a human.

As used herein, devices, including those associated with the back-end application computer server 150 and any other device described herein may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The back-end application computer server 150 may store information into and/or retrieve information from the computer store 110. The computer store 110 might, for example, store electronic records representing risk associations, each electronic record being associated with a different record identifier, communication address, record characteristic values, and/or attribute variables. The computer store 110 may also contain information about past and current interactions with parties, including those associated with remote communication devices. The computer store 110 may be locally stored or reside remote from the back-end application computer server 150. As will be described further below, the computer store 110 may be used by the back-end application computer server 150 to predict a future performance estimation value for an electronic record. Although a single back-end application computer server 150 is shown in FIG. 1, any number of such devices may be included. Moreover, various devices described herein might be combined according to embodiments of the present invention. For example, in some embodiments, the back-end application computer server 150 and computer store 110 might be co-located and/or may comprise a single apparatus.

According to some embodiments, the system 100 may automatically predict a future performance estimation value via the automated back-end application computer server 150. For example, at (1) the remote administrator computer 160 may request that a batch of electronic records be analyzed to automatically determine predicted future performance estimation values as appropriate. The future performance estimation assessment tool platform 130 may then access information in the computer store 110 at (2) and exchange information with the administrator at (3) to support an interactive user interface display (e.g., including indications of predicted future performance estimation values to the administrator).

Figure 2:
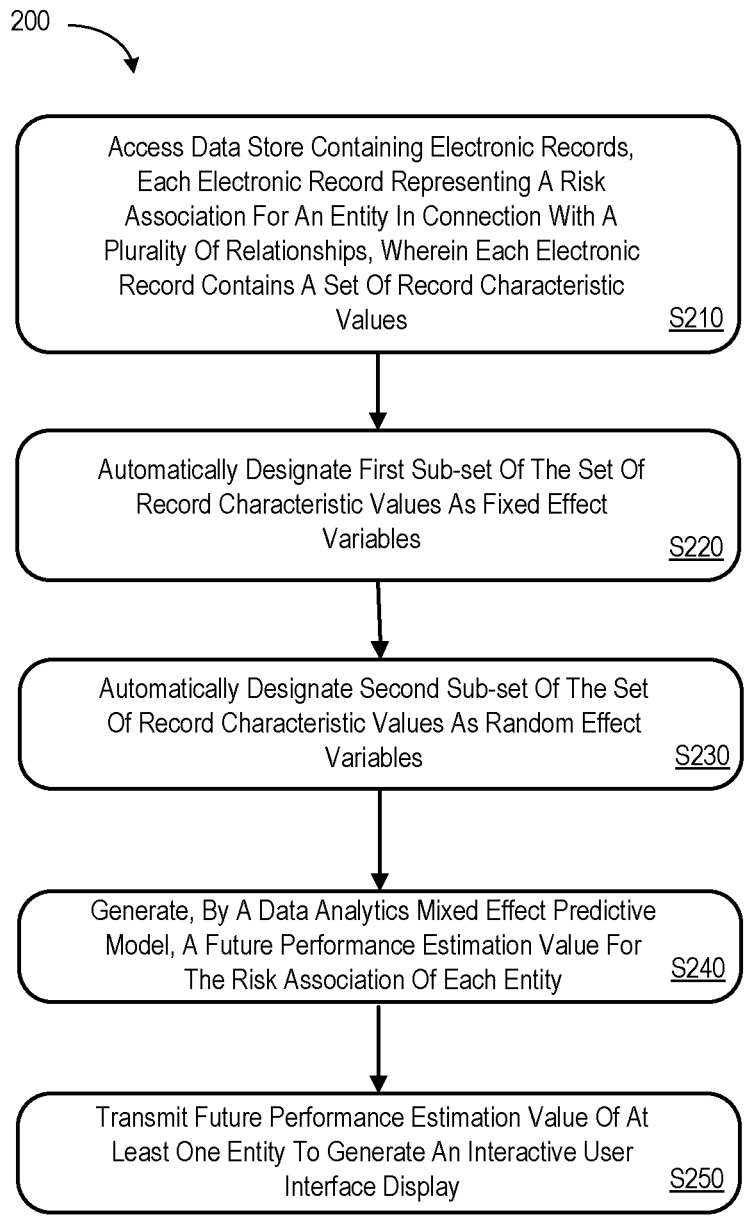
FIG. 2 illustrates a method according to some embodiments of the present invention.

Note that the system 100 of FIG. 1 is provided only as an example, and embodiments may be associated with additional elements or components. According to some embodiments, the elements of the system 100 automatically support interactive user interface displays over a distributed communication network. FIG. 2 illustrates a method 200 that might be performed by some or all of the elements of the system 100 described with respect to FIG. 1, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S210, an automated back-end application computer server may access a data store containing electronic records, each electronic record representing a risk association for an entity in connection with a plurality of relationships, wherein each electronic record contains a set of record characteristic values. At S220, the system may automatically designate a first sub-set of the set of record characteristic values as "fixed effect" variables and at S230 the system may automatically designate a second sub-set of the set of record characteristic values as "random effect" variables. At S240, a data analytics "mixed effect" predictive model may then generate, based on the fixed effect variables and the random effect variables, a future performance estimation value for the risk association of each entity in connection with its plurality of relationships.

As used herein, a "mixed effect" predictive model may be associated with a discovery and/or communication of potentially meaningful patterns in data. For example, recorded information may let analytics rely on a simultaneous application of statistics, computer programming, and/or operations research to quantify and/or predict future performance. Moreover, a data analytics mixed effect predictive model may include both a fixed effect portion (where a variable assumes predicted targets can be estimated directly from data without any relationship between targets) and a random effect portion (where a variable assumes predicted targets are drawn from a specified distribution, such a hierarchical structure). Note that a fixed effect model may have more volatile predictions as compared to a non-fixed effect model. Moreover, a fixed effect model may assume that a small set of results with no bad outcomes is associated with substantially zero risk. In contrast, a random effect model might assume that a small set of results with no bad outcomes is associated with a substantially average risk. According to some embodiments, a future performance estimation value may further be based at least in part on a generalized linear model and/or a generalized linear mixed effect model.

By way of example, the data analytics mixed effect predictive model may be defined as:

$$Y = X\beta + Zu + e$$

where Y is a known vector of observations, with mean $E(I)=X\beta,\beta$ represents a fixed effect intercept (e.g., an unknown vector of fixed effects), u represents a random effect predictor (e.g., an unknown vector of random effects with means $E(u)=0$ and variance-covariance matrix $var(u)=G$), and e represents an error term (e.g., an unknown vector of random errors with mean $E(e)=0$ and variance $var(e)=R$). Note that X and Z may represent known design matrices relating the observations Y to $\beta$ and u, respectively. As a result, the mixed model may comprise a statistical model that contains both fixed effects and random effects. Such a model may be useful in a setting where repeated measurements are made on the similar statistical units (e.g., a longitudinal study) or where measurements are made on clusters of related statistical units. Because of advantages in dealing with missing values, a mixed effects models may be more appropriate as compared to other traditional approaches, such as repeated measures of an Analysis Of Variance ("ANOVA") model.

At S250, the system may transmit an indication associated with the future performance estimation value for the risk association of at least one entity in connection with its plurality of relationships to generate an interactive user interface display. This transmitting may be, for example, performed by a communication port, coupled to the back-end application computer server, that facilitates an exchange of electronic messages via a distributed communication network, supporting the interactive user interface display.

Figure 3:
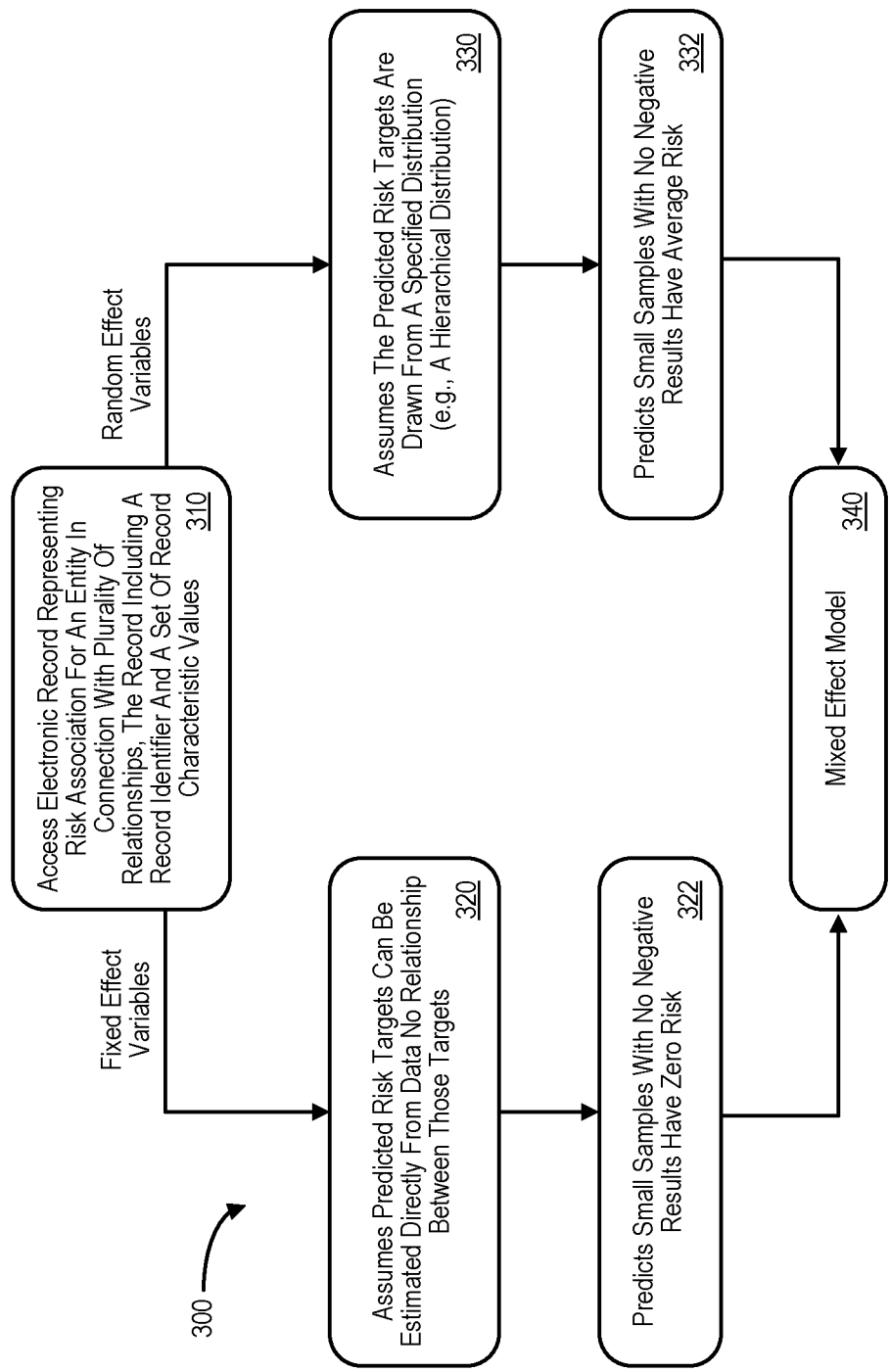
FIG. 3 is a process flow in accordance with some embodiments of the present invention.

FIG. 3 is a process flow 300 in accordance with some embodiments of the present invention. At 310, a back-end application computer server may access electronic records representing a risk association for an entity in connection with a plurality of relationships (e.g., relationships between the entity and other parties). The record may include, according to some embodiments, a set of record characteristic values. These record characteristic values may then be divided into fixed effect variables at 320 and random effect variables at 330. The fixed effect variables may, for example, assume that one or more predictive risk targets can be estimated directly from data (and no relationship between those targets may be assumed). The random effect variables may, for example, assume that one or more predictive risk targets are drawn from a specified distribution, such as a hierarchical distribution. Note that the fixed effect variables may, at 322, predict that small samples with few bad outcomes have substantially zero risk. In contrast, the random effect variables may, at 332, predict that small samples with few bad outcomes have substantially average risk. The fixed effect variables and random effect variables may then both be fed into a mixed effect model at 340 in accordance with any of the embodiments described herein.

Figure 4:
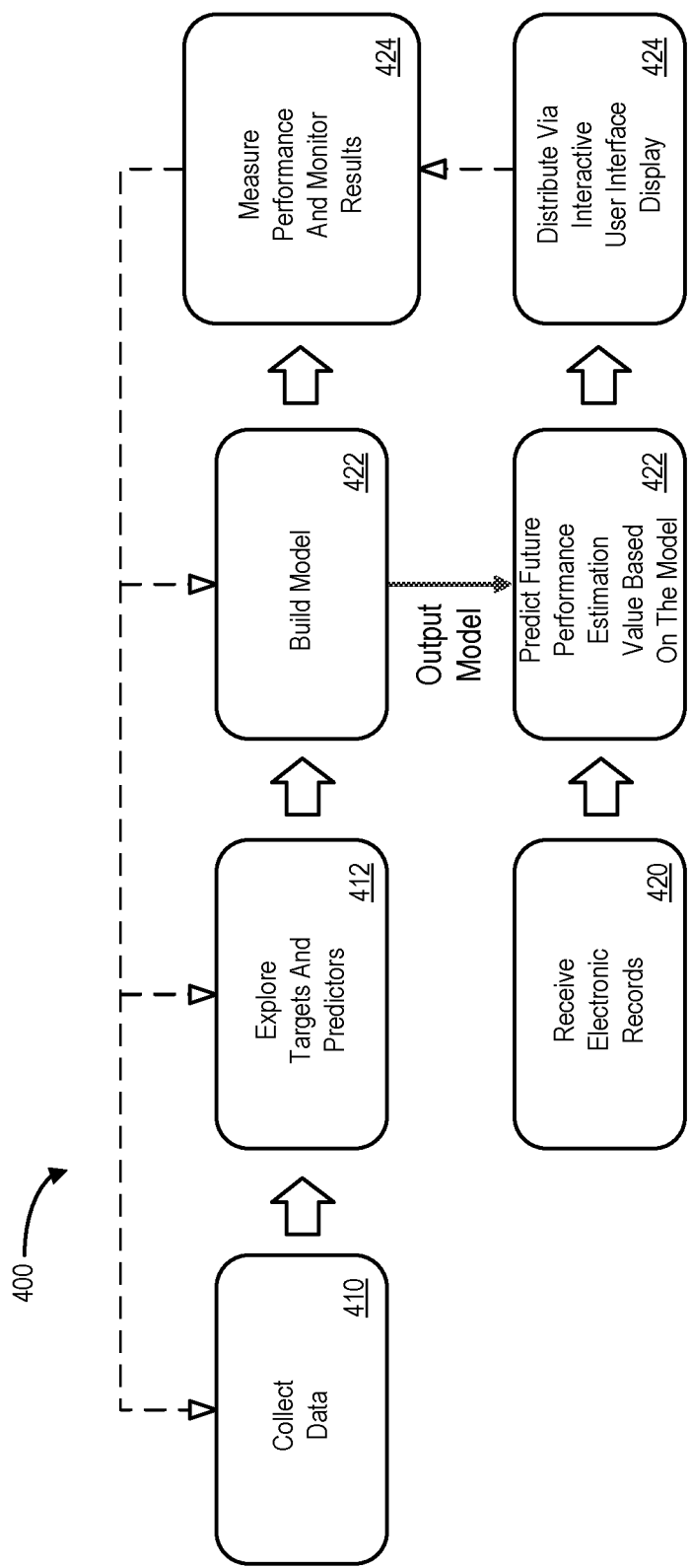
FIG. 4 is a process timeline according to some embodiments.

FIG. 4 is a process timeline 400 according to some embodiments. At 410, data may be collected. The collected data might, for example, be associated with prior risk associations, record characteristic values, and/or outcomes (e.g., performance values). At 412, targets and predictors may be explored and a mixed effect model may be created at 414. For example, it might be automatically determined that one or more record characteristic values tend to accurately predict eventual performance values. At 420, one or more electronic records may be received and the mixed effect model may be used to predict a future performance estimation value for that record at 422. The predicted future performance estimation value may then be distributed via an interactive user interface display at 424. Moreover, the predicted future performance estimation value may be used to measure the performance (e.g., accuracy) of the mixed effect model and/or to monitor overall system results at 416. The results of these measurements and monitoring may then be used to adjust and/or re-analyze collected data, targets and predictors, and/or the mixed effect model to improve the overall operation and performance of the system.

Figure 5:
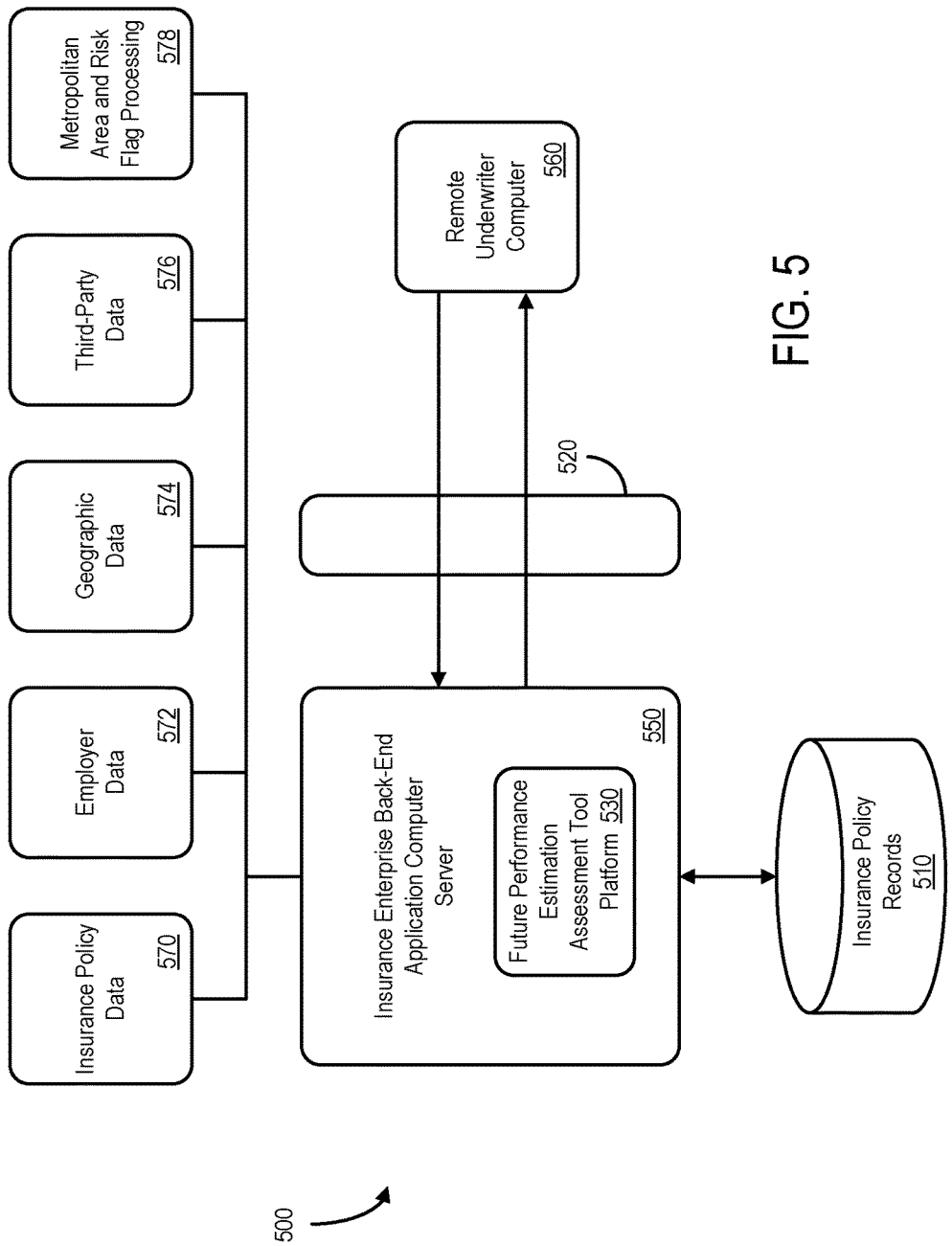
FIG. 5 is a high-level block diagram of an insurance enterprise system according to some embodiments of the present invention.

Note that embodiments described herein may be utilized by different types of enterprises. For example, FIG. 5 is a high-level block diagram of an insurance enterprise system 500 according to some embodiments of the present invention. As before, the system 500 includes an insurance enterprise back-end application computer server 550 that may access insurance policy records 510 (e.g., storing a set of electronic records, each record representing an insurance policy and including one or more communication addresses, characteristic values, attribute variables, etc.). The back-end application computer server 550 may also exchange information with a remote underwriter computer 560 (e.g., via a firewall 520). According to some embodiments, a future performance estimation assessment tool platform 530 of the back-end application computer server 550 may facilitate a prediction of a future performance value and/or the display of results via one or more remote underwriter computers 560. The future performance value might be associated with, for example, an insurance policy premium or deductible value. The back-end application computer server 550 might be, for example, associated with a PC, laptop computer, smartphone, an enterprise server, a server farm, and/or a database or similar storage devices. Devices, including those associated with the back-end application computer server 550 and any other device described herein, may exchange information via any communication network which may be one or more of a LAN, a MAN, a WAN, a proprietary network, a PSTN, a WAP network, a Bluetooth network, a wireless LAN network, and/or an IP network such as the Internet, an intranet, or an extranet.

The back-end application computer server 550 may store information into and/or retrieve information from the insurance policy records 510. The insurance policy records 510 might, for example, store insurance policy identifiers, communication addresses, characteristic values (e.g., an employer location, a type of business, a number of employees, etc.), and/or attribute variables. The insurance policy records 510 may also contain information about past and current interactions with parties, including those associated with remote communication devices. According to this embodiment, the computer server 550 may also exchange information with a distribution center (e.g., to arrange for postal mailing to be distributed and collected in connection with an insurance policy renewal process), a telephone call center (e.g., to arrange for telephone calls to be made in connection with new insurance quotes), an email server, a third-party data device (e.g., to receive business financial score data, governmental information, etc.), and/or a predictive model.

Some embodiments described herein may be associated with an Employment Practices Liability ("EPL") insurance policy. For example, each entity may be an employer, the plurality of "relationships" may comprise a plurality of employer-employee relationships, and the "risk association" may comprise the employment practices liability insurance policy. As used herein, the phrase "employment practices liability" insurance policy might refer to a policy that protects an employer against claims from employees in connection with alleged wrongful acts arising from the employment process, including claims associated with discrimination, harassment, retaliation, violation of a governmental employment regulation or statute (e.g., the Family and Medical Leave Act ("FMLA")), wrongful discipline, wrongful failure to promote, and/or wrongful termination.

According to some embodiments, the data analytics mixed effect predictive model may be associated with a generalized linear mixed effect model that has: insurance policy information as a fixed effect predictor model input, geographic metropolitan area data as a random effect predictor model input, and risk estimates as a model output. Note that a closed solution might be available for a linear mixed effect model but no closed solution might be available for other generalized linear mixed models.

For example, at least some of the record characteristic values may be associated with insurance policy data 570, such as an insurance policy length, a deductible amount, a coverage limit, and/or a deductible self-insured retention amount. Other record characteristic values might be associated with employer data 572, such as a number of employees (e.g., because a cost per employee might decrease as an overall number of employees increases), a number of employees, employee turnover data, an average cost per employee by employer size, an industry category, a number of claims, a company financial score (e.g., associated with a bankruptcy risk), one or more human resources policies that are or will be in effect, tenure data, a public or private business indicator, Equal Employment Opportunity Commission charges, a new business indicator, and/or an amount of time in business indicator. As still another example, one or more record characteristic values might be associated with location or geographic data 574, such as a country, a county, a ZIP code, a state grouping, local unemployment data, local EEOC charges, local per-capita lawyer and litigation climate data, and/or local census information (e.g., the age, gender, etc. of a local population). Still another example of record characteristic values might comprise third-party data 576, such as a financial score, social media information (e.g., social media scores, reviews, etc.), economic indicators (e.g., available from the Department of Labor), and/or macro-economic conditions. According to some embodiments, at least some of the set of record characteristic values may be associated with other types of insurance, such as workers' compensation insurance, disability insurance, and/or general liability insurance. For example, one or more record characteristic values might indicate whether or not the employer offers disability insurance, a workers' compensation score assigned to the employer, components of such a workers' compensation score, etc.

Some embodiments may be associated with metropolitan area and/or risk flag processing 578. For example, a future performance estimation value might be associated with a geographic metropolitan risk analysis such that an enterprise may balance profitability and growth by geographic region. Note that some geographic areas may be more prone to class actions and/or be associated with various delays between an alleged act of wrongdoing and a filing of a complaint (based on statutes, state regulations, etc.). Moreover, in some embodiments a future performance estimation value may be associated with a portfolio risk flag that uses one or more third-party economic indicators to help monitor macro-economic conditions for risk and assess growth objectives as follows:

$$\text{Risk Flag} = w_1 * \text{US\_LEI} + w_2 * \text{US\_CEI}$$

where $w_1$ and $w_2$ are weighting factors, US_LEI is associated with a United States leading economic indicator and US_CEI is associated with a United States coincident economic indicator. The risk flag might be, according to some embodiments, automatically updated based on information received from a Federal Reserve platform to may reflect that risk may increase (or decrease in future), based on a region, an industry, etc.

Record characteristic values may be collected in a number of different ways. For example, each electronic record (e.g., insurance policy) may be associated with a record identifier and a communication address, and the sets of record characteristic values might be collected by sending a communication to that communication address and receiving, from a party associated with an electronic record having that communication address, a response to the communication. Note that a postal mailing might be automatically generated and/or received by a distribution center, an email might be automatically generated by an email server, information could be provided and/or collected via: a web interface, an Interactive Voice Response ("IVR") system associated with a telephone call center, a chat application that interacts with a party in substantially real time, and/or a video link (e.g., with an insurance agent or underwriter). According to some embodiments, after the future performance estimation values are generated, the back-end application computer server 550 is to further periodically monitor performance outcomes and automatically adjust the data analytics mixed effect predictive model (e.g., to improve outcomes, risk profitability, risk quality, policy growth, etc.).

Figure 6:
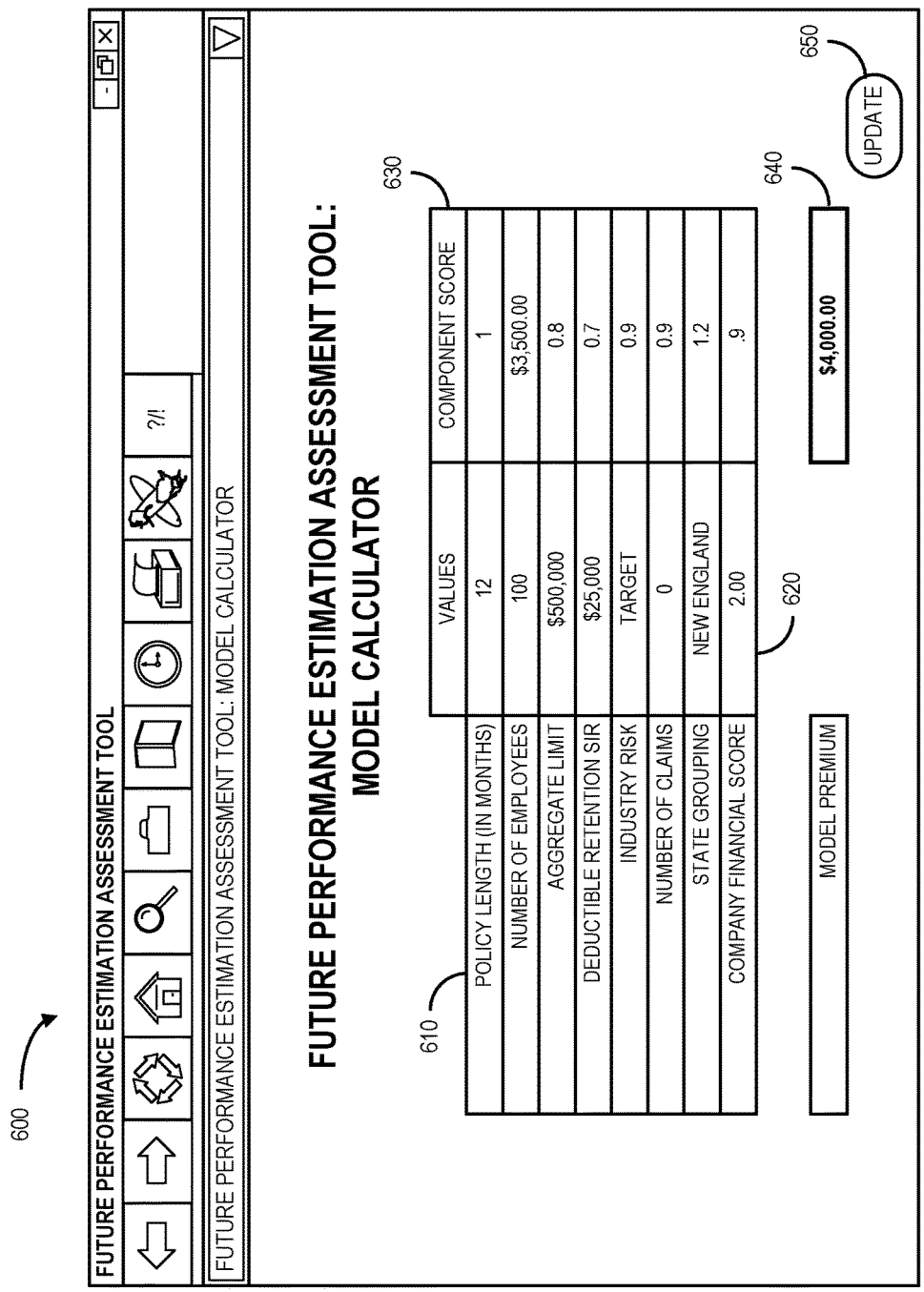
FIG. 6 illustrates an exemplary model calculator display that might be associated with various embodiments.

FIG. 6 illustrates an exemplary mixed effect model calculator display 600 (e.g., associated with a loss driven model calculator) that might be associated with various embodiments described herein. The display 600 includes a number of different types of record attributes 610 (e.g., a length of an insurance policy, a number of employees, prior claim data, etc.) along with values 620 for each type of record attribute 610. The model calculator display 600 further includes a weighting or component score 630 for each type of record attribute 610 which may be used to calculate an overall mixed effect model premium 640 or predicted loss ratio (e.g., upon selection of an update icon 650 by an underwriter) that might be used to evaluate a potential insurance policy (e.g., by comparing risks associated with the potential insurance policy with risks associated with other potential insurance policies). The model calculator display 600 might be used, for example, by an underwriter to help determine a price versus risk exposure in view of analytics with respect to retention, yield, claim frequency, dislocation, etc.

Figure 7:
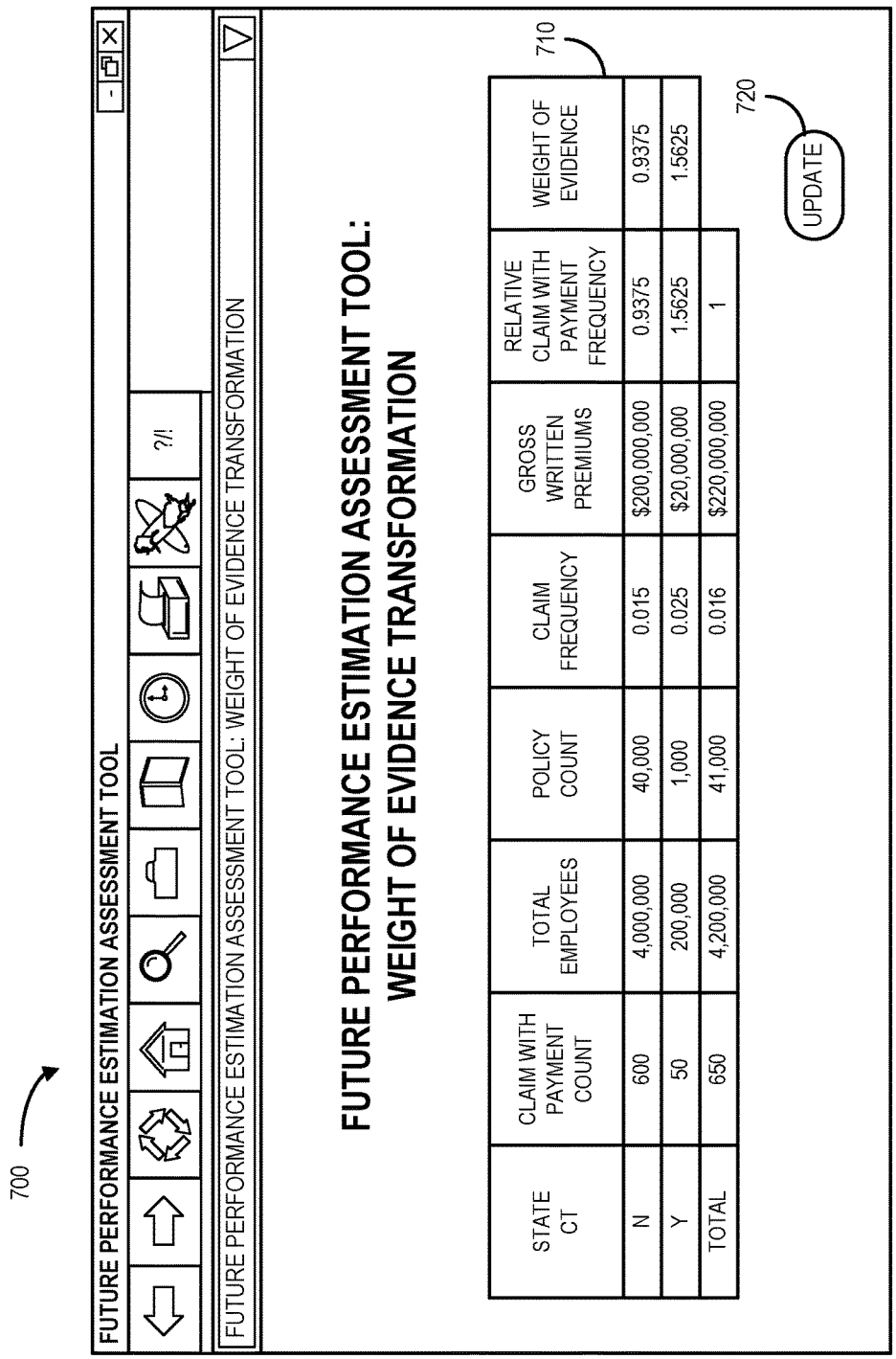
FIG. 7 illustrates an exemplary weight of evidence transformation display according to some embodiments of the present invention.

The component scores 630 may be created, according to some embodiments, in connection with a Weight of Evidence ("WoE"). FIG. 7 illustrates an exemplary weight of evidence transformation display 700 according to some embodiments of the present invention. As used herein, the phrase "weight of evidence transformation" may refer to a function that transform predictor variables into categories and assigns to each category a unique weight of evidence value. According to some embodiments, a weight of evidence value may be derived from the following ratio:

$$WoE = \frac{\text{Distribution of Good Outcomes}}{\text{Distribution of Bad Outcomes}}$$

where the distribution of good outcomes and the distribution of bad outcomes refer to the respective group expressed as relative proportions of a total number:

$$WoE = \left[\ln\left(\frac{\text{Distribution of Good Outcomes}}{\text{Distribution of Bad Outcomes}}\right)\right] * 100$$

Note that the rating factor WoE may be related to the relative risk of a group. For example, the relative claim frequency, pure premium, etc. of a predictor can be WoE coded as a transformed predictor. The WoE coded predictors may then be used as an input to a generalized linear regression. Consider the example 710 in the display 700 of FIG. 7 using "Connecticut" ("CT") as an indicator. The example 710 includes an indication of whether or not a potential insurance policy is associated with CT, a count of claims with payments, a total number of employees, a policy count, a claim frequency, gross written premium data, relative claims with payment frequency, and a WoE value. In this example, the relative claims frequency for potential insurance policies not associated with CT is:

$$\frac{\text{Claim Frequency of Non-}Connecticut}{\text{Claim Frequency for All Potential Insurance Policies}} = \frac{0.015}{0.016} = 0.9375$$

Note that a WoE value might help preserve relative risk relationships between categories of a predictor (which may help a model developer and user ensure that a model makes both "business" and "common" sense). Moreover, a WoE value may help identify whether a relationship changes in a multivariate regression by looking at the sign of the parameter estimates of the WoE-coded predictors. In addition, WoE-coded predictors may be at the same scale (simplifying score card generation) and may all be continuous (and can therefore be input to almost any type of regression). Note, however, that a WoE may represent a constrained relationship derived from exploratory data analysis and may not discover the true relationship in a multi-variate world. This can potentially lead to an over-fitted model for some subcategory risks.

Figure 8:
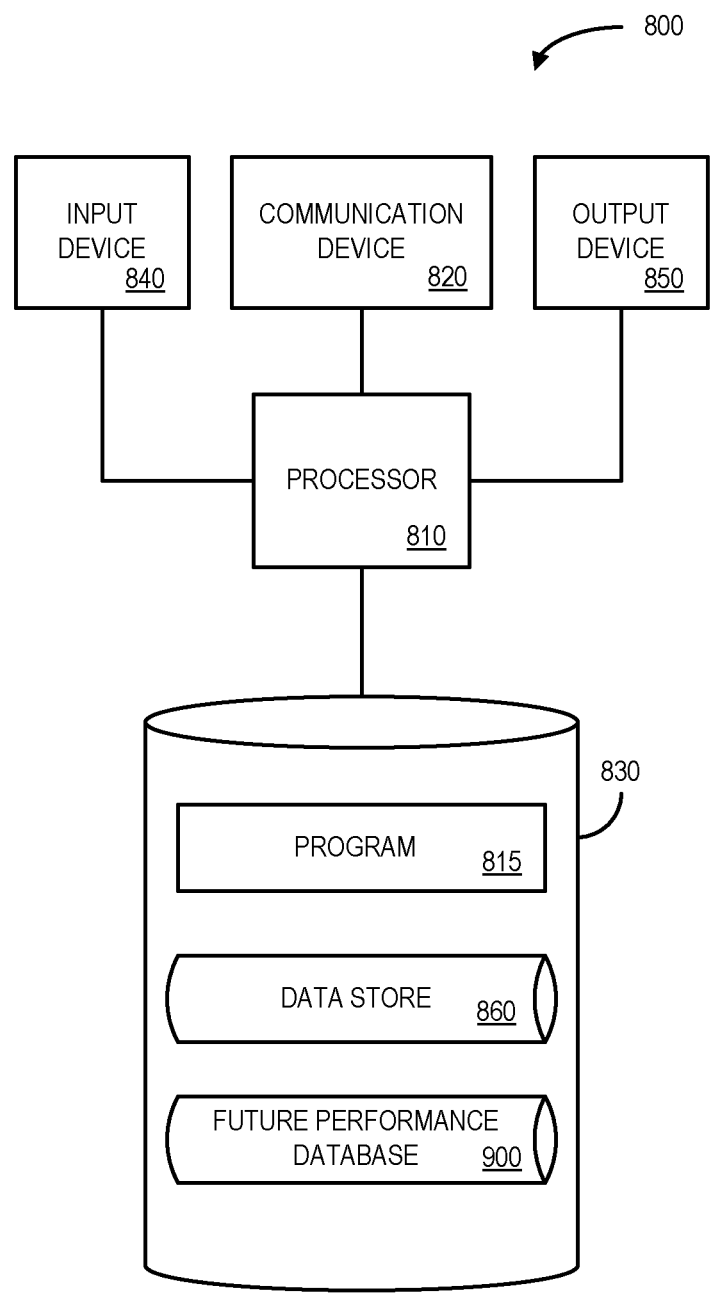
FIG. 8 is a block diagram of an apparatus in accordance with some embodiments of the present invention.

Embodiments described herein may comprise a tool (that does not determine a specific insurance rating) that gives guidance and suggested direction to an underwriter and that may be implemented using any number of different hardware configurations. For example, FIG. 8 illustrates a back-end application computer server 800 that may be, for example, associated with the systems 100, 500 of FIGS. 1 and 5, respectively. The back-end application computer server 800 comprises a processor 810, such as one or more commercially available Central Processing Units ("CPUs") in the form of one-chip microprocessors, coupled to a communication device 820 configured to communicate via a communication network (not shown in FIG. 8). The communication device 820 may be used to communicate, for example, with one or more remote administrator computers and or communication devices (e.g., PCs and smartphones). Note that communications exchanged via the communication device 820 may utilize security features, such as those between a public internet user and an internal network of the insurance enterprise. The security features might be associated with, for example, web servers, firewalls, and/or PCI infrastructure. The back-end application computer server 800 further includes an input device 840 (e.g., a mouse and/or keyboard to enter information about potential insurance policies, historic information, predictive models, etc.) and an output device 850 (e.g., to output reports regarding system administration and/or audit performance).

The processor 810 also communicates with a storage device 830. The storage device 830 may comprise any appropriate information storage device, including combinations of magnetic storage devices (e.g., a hard disk drive), optical storage devices, mobile telephones, and/or semiconductor memory devices. The storage device 830 stores a program 815 and/or a risk evaluation tool or application for controlling the processor 810. The processor 810 performs instructions of the program 815, and thereby operates in accordance with any of the embodiments described herein. For example, the processor 810 may access a data store containing electronic records, each electronic record representing a risk association for an entity in connection with a plurality of relationships, and each electronic record may contain a set of record characteristic values. The processor 810 may automatically designate a first sub-set of the set of record characteristic values as fixed effect variables and a second sub-set as random effect variables. A data analytics mixed effect predictive model may then generate, based on the fixed and random effect variables, a future performance estimation value for the risk association of each entity in connection with its plurality of relationships. An indication associated with the future performance estimation value for the risk association of at least one entity in connection with its plurality of relationships may then be transmitted by the processor 810 to generate an interactive user interface display.

The program 815 may be stored in a compressed, uncompiled and/or encrypted format. The program 815 may furthermore include other program elements, such as an operating system, a database management system, and/or device drivers used by the processor 810 to interface with peripheral devices.

As used herein, information may be "received" by or "transmitted" to, for example: (i) the back-end application computer server 800 from another device; or (ii) a software application or module within the back-end application computer server 800 from another software application, module, or any other source.

In some embodiments (such as shown in FIG. 8), the storage device 830 further stores a computer data store 860 (e.g., associated with a set of destination communication addresses, record characteristic values, attribute variables, etc.) and a future performance database 900. An example of a database that might be used in connection with the back-end application computer server 800 will now be described in detail with respect to FIG. 9. Note that the database described herein is only an example, and additional and/or different information may be stored therein. Moreover, various databases might be split or combined in accordance with any of the embodiments described herein. For example, the computer data store 860 and/or future performance database 900 might be combined and/or linked to each other within the program 815.

Referring to FIG. 9, a table is shown that represents the future performance database 900 that may be stored at the back-end application computer server 800 according to some embodiments. The table may include, for example, entries identifying new or existing insurance policies (including insurance policies that may be up for renewal). The table may also define fields 902, 904, 906, 908, 910, 912 for each of the entries. The fields 902, 904, 906, 908, 910, 912 may, according to some embodiments, specify: an electronic record identifier 902, a communication address 904, values for fixed effect variables 906, values for random effect variables 908, future performance estimation value 910, and a status 912. The future performance database 900 may be created and updated, for example, based on information electrically received from a computer data store and/or an insurance underwriter or agent.

The electronic record identifier 902 may be, for example, a unique alphanumeric code identifying an insurance policy and the communication address 904 might be used to collect information about that insurance policy (e.g., a type of business, a number of employees, a history of EEOC charges, etc.). This collected information may then be divided into a values for affixed effect variables 906 and values for random effect variables 908 that are to be input to a mixed effect model. The output of the mixed effect model may be the future performance estimation values 910 (e.g., a risk score, predicted premium, loss ratio, etc.). The status 912 might indicate, for example, that the potential insurance policy associated with the electronic record identifier 902 has been denied, adjusted (e.g., with a modified premium, an endorsement removing a specific type of risk, etc.), or issued to an insured.

Figure 10:
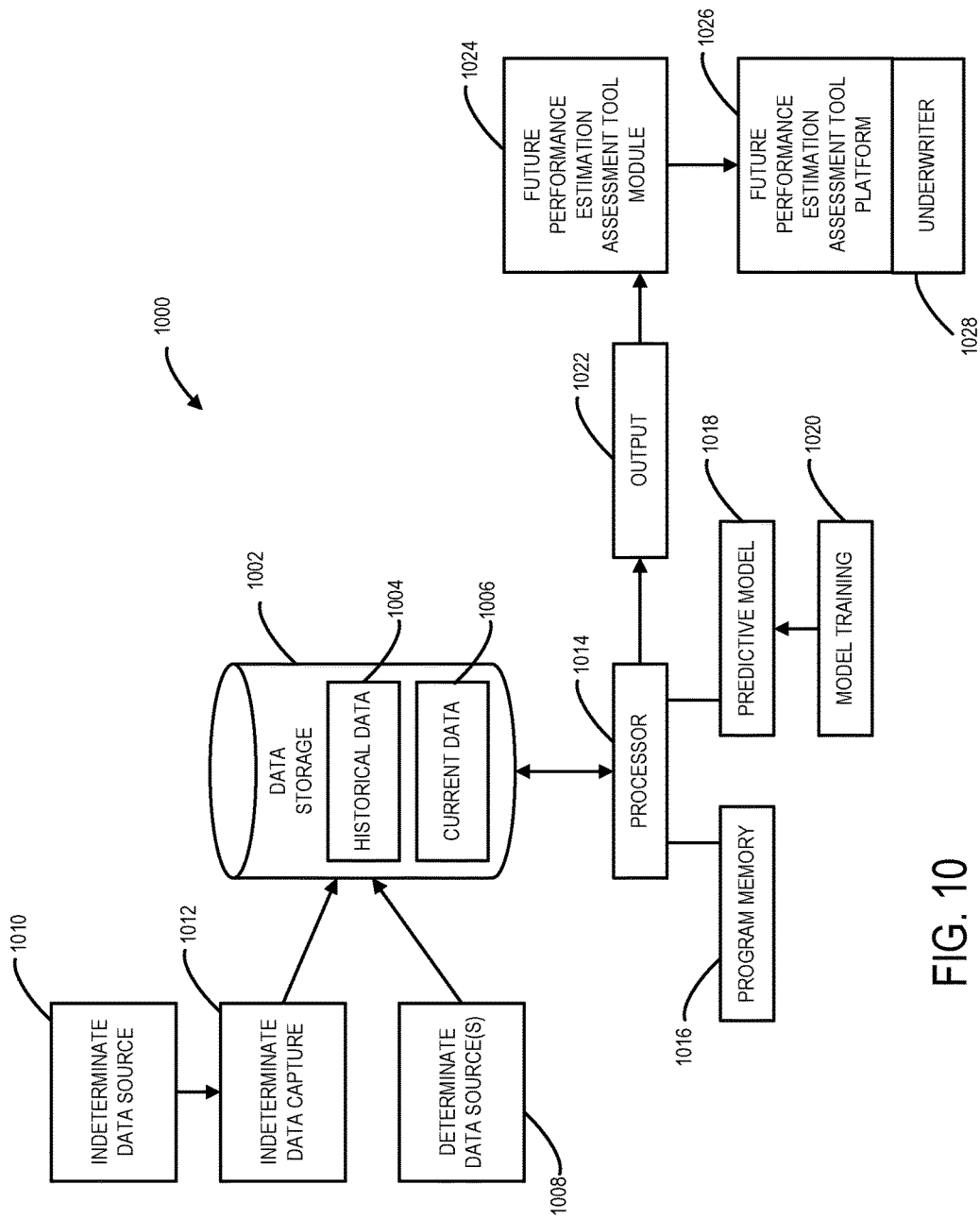
FIG. 10 illustrates a system having a predictive model in accordance with some embodiments.

According to some embodiments, one or more predictive models (e.g., mixed effect models) may be used to select, create, and/or evaluate electronic messages. Features of some embodiments associated with a predictive model will now be described by first referring to FIG. 10. FIG. 10 is a partially functional block diagram that illustrates aspects of a computer system 1000 provided in accordance with some embodiments of the invention. For present purposes it will be assumed that the computer system 1000 is operated by an insurance company (not separately shown) for the purpose of supporting insurance policy audits (e.g., to confirm the accuracy of electronic records associated with insurance policies).

The computer system 1000 includes a data storage module 1002. In terms of its hardware the data storage module 1002 may be conventional, and may be composed, for example, by one or more magnetic hard disk drives. A function performed by the data storage module 1002 in the computer system 1000 is to receive, store and provide access to both historical transaction data (reference numeral 1004) and current transaction data (reference numeral 1006). As described in more detail below, the historical transaction data 1004 is employed to train a predictive model to provide an output that indicates an identified performance metric and/or an algorithm to score performance factors, and the current transaction data 1006 is thereafter analyzed by the predictive model. Moreover, as time goes by, and results become known from processing current transactions (e.g., claims made against other EPL insurance policies), at least some of the current transactions may be used to perform further training of the predictive model. Consequently, the predictive model may thereby appropriately adapt itself to changing conditions.

Either the historical transaction data 1004 or the current transaction data 1006 might include, according to some embodiments, determinate and indeterminate data. As used herein and in the appended claims, "determinate data" refers to verifiable facts such as the an age of a business; an automobile type; a policy date or other date; a time of day; a day of the week; a geographic location, address or ZIP code; and a policy number.

As used herein, "indeterminate data" refers to data or other information that is not in a predetermined format and/or location in a data record or data form. Examples of indeterminate data include narrative speech or text, information in descriptive notes fields and signal characteristics in audible voice data files.

The determinate data may come from one or more determinate data sources 1008 that are included in the computer system 1000 and are coupled to the data storage module 1002. The determinate data may include "hard" data like a claimant's name, date of birth, social security number, policy number, address, an underwriter decision, etc. One possible source of the determinate data may be the insurance company's policy database (not separately indicated).

The indeterminate data may originate from one or more indeterminate data sources 1010, and may be extracted from raw files or the like by one or more indeterminate data capture modules 1012. Both the indeterminate data source(s) 1010 and the indeterminate data capture module(s) 1012 may be included in the computer system 1000 and coupled directly or indirectly to the data storage module 1002. Examples of the indeterminate data source(s) 1010 may include data storage facilities for document images, for text files, and digitized recorded voice files. Examples of the indeterminate data capture module(s) 1012 may include one or more optical character readers, a speech recognition device (i.e., speech-to-text conversion), a computer or computers programmed to perform natural language processing, a computer or computers programmed to identify and extract information from narrative text files, a computer or computers programmed to detect key words in text files, and a computer or computers programmed to detect indeterminate data regarding an individual.

The computer system 1000 also may include a computer processor 1014. The computer processor 1014 may include one or more conventional microprocessors and may operate to execute programmed instructions to provide functionality as described herein. Among other functions, the computer processor 1014 may store and retrieve historical insurance transaction data 1004 and current transaction data 1006 in and from the data storage module 1002. Thus the computer processor 1014 may be coupled to the data storage module 1002.

The computer system 1000 may further include a program memory 1016 that is coupled to the computer processor 1014. The program memory 1016 may include one or more fixed storage devices, such as one or more hard disk drives, and one or more volatile storage devices, such as RAM devices. The program memory 1016 may be at least partially integrated with the data storage module 1002. The program memory 1016 may store one or more application programs, an operating system, device drivers, etc., all of which may contain program instruction steps for execution by the computer processor 1014.

The computer system 1000 further includes a predictive model component 1018. In certain practical embodiments of the computer system 1000, the predictive model component 1018 may effectively be implemented via the computer processor 1014, one or more application programs stored in the program memory 1016, and computer stored as a result of training operations based on the historical transaction data 1004 (and possibly also data received from a third party). In some embodiments, data arising from model training may be stored in the data storage module 1002, or in a separate computer store (not separately shown). A function of the predictive model component 1018 may be to determine appropriate risk EPL information for a set of insurance policies. The predictive model component may be directly or indirectly coupled to the data storage module 1002.

The predictive model component 1018 may operate generally in accordance with conventional principles for mixed effect predictive models, except, as noted herein, for at least some of the types of data to which the predictive model component is applied. Those who are skilled in the art are generally familiar with programming of predictive models. It is within the abilities of those who are skilled in the art, if guided by the teachings of this disclosure, to program a mixed effect predictive model to operate as described herein.

Still further, the computer system 1000 includes a model training component 1020. The model training component 1020 may be coupled to the computer processor 1014 (directly or indirectly) and may have the function of training the predictive model component 1018 based on the historical transaction data 1004 and/or information about potential insureds. (As will be understood from previous discussion, the model training component 1020 may further train the predictive model component 1018 as further relevant data becomes available.) The model training component 1020 may be embodied at least in part by the computer processor 1014 and one or more application programs stored in the program memory 1016. Thus, the training of the predictive model component 1018 by the model training component 1020 may occur in accordance with program instructions stored in the program memory 1016 and executed by the computer processor 1014.

In addition, the computer system 1000 may include an output device 1022. The output device 1022 may be coupled to the computer processor 1014. A function of the output device 1022 may be to provide an output that is indicative of (as determined by the trained predictive model component 1018) particular performance metrics, automatically determined EPL risk information, etc. The output may be generated by the computer processor 1014 in accordance with program instructions stored in the program memory 1016 and executed by the computer processor 1014. More specifically, the output may be generated by the computer processor 1014 in response to applying the data for the current simulation to the trained predictive model component 1018. The output may, for example, be a numerical estimate and/or likelihood within a predetermined range of numbers. In some embodiments, the output device may be implemented by a suitable program or program module executed by the computer processor 1014 in response to operation of the predictive model component 1018.

Still further, the computer system 1000 may include a future performance estimation assessment tool module 1024. The future performance estimation assessment tool module 1024 may be implemented in some embodiments by a software module executed by the computer processor 1014. The future performance estimation assessment tool module 1024 may have the function of rendering a portion of the display on the output device 1022. Thus, the future performance estimation assessment tool module 1024 may be coupled, at least functionally, to the output device 1022. In some embodiments, for example, the future performance estimation assessment tool module 1024 may report results and/or predictions by routing, to an underwriter 1028 via future performance estimation tool platform 1026, a results log, and/or automatically generated EPL risk data generated by the mixed effect predictive model component 1018. In some embodiments, this information may be provided to the underwriter 1028 who may also be tasked with determining whether or not the results may be improved (e.g., by further adjusting a premium or other information associated with an EPL insurance policy).

Thus, embodiments may provide an automated and efficient way to analyze electronic records associated with EPL insurance policies. The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

According to some embodiments, a mixed effect model may generate a model tier score associated with an EPL model premium and/or an employee cost. This information may then be used to rank all policies by tier score and EPL insurance policies may be grouped into ten groups of substantially equal business. Moreover, a claim frequency can be calculated for each decile and results may be compared for model premium, manual premium, and written premium values (e.g., to evaluate and/or improve the results of a mixed effect model for EPL insurance policies).

Figure 11:
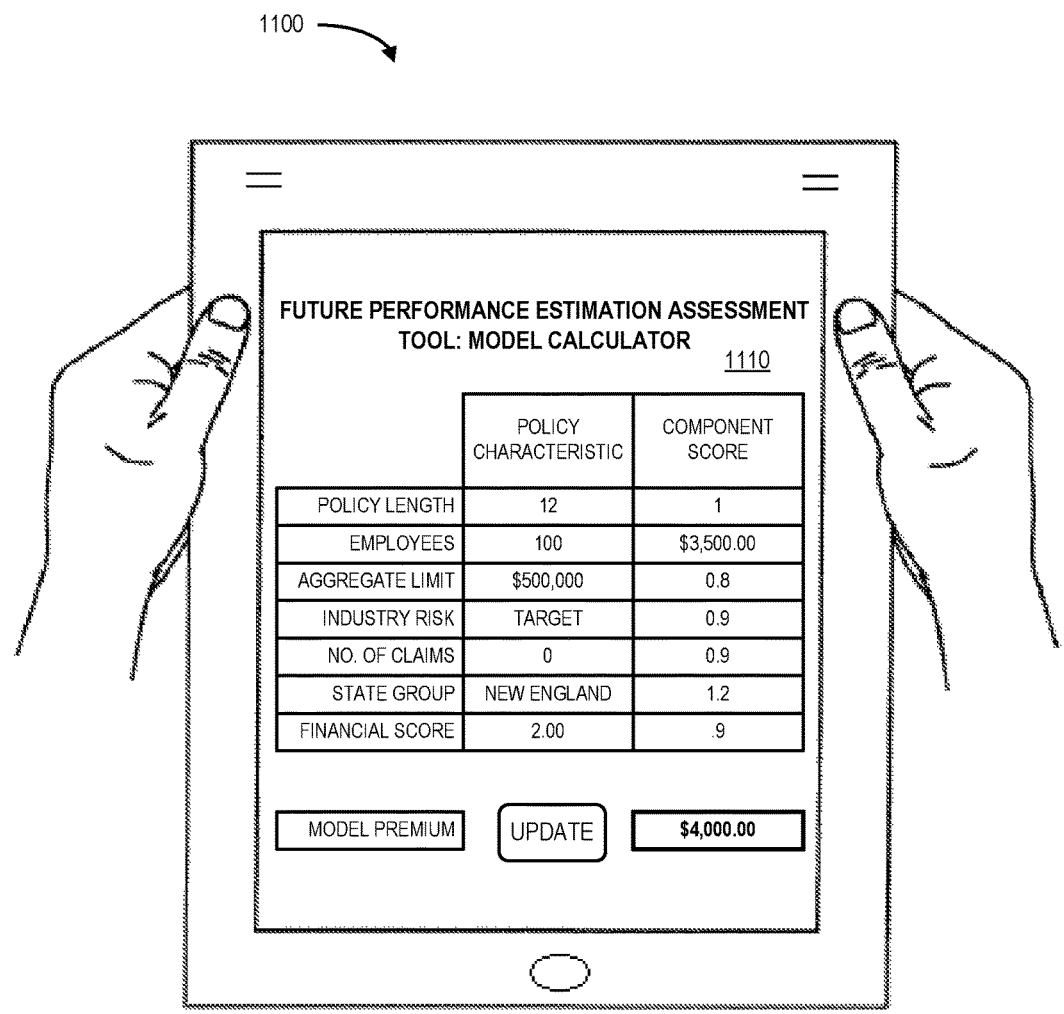
FIG. 11 illustrates a tablet computer displaying a model calculator according to some embodiments.

Although specific hardware and data configurations have been described herein, note that any number of other configurations may be provided in accordance with embodiments of the present invention (e.g., some of the information associated with the displays described herein might be implemented as a virtual or augmented reality display and/or the databases described herein may be combined or stored in external systems). Moreover, although embodiments have been described with respect to particular types of communication addresses, embodiments may instead be associated with other types of communications (e.g., chat implementations, web-based messaging, etc.). Similarly, although a certain types of record characteristic values were described in connection some embodiments, other types of data might be used instead. Still further, the displays and devices illustrated herein are only provided as examples, and embodiments may be associated with any other types of user interfaces. For example, FIG. 11 illustrates a handheld tablet computer 1100 displaying mixed effect model calculator display 1110 according to some embodiments. The mixed effect model calculator display 1110 might include user-selectable graphical data providing information about electronic records (and EPL insurance related information) that can be selected and/or modified by a user of the handheld computer 1100.

Figure 12:
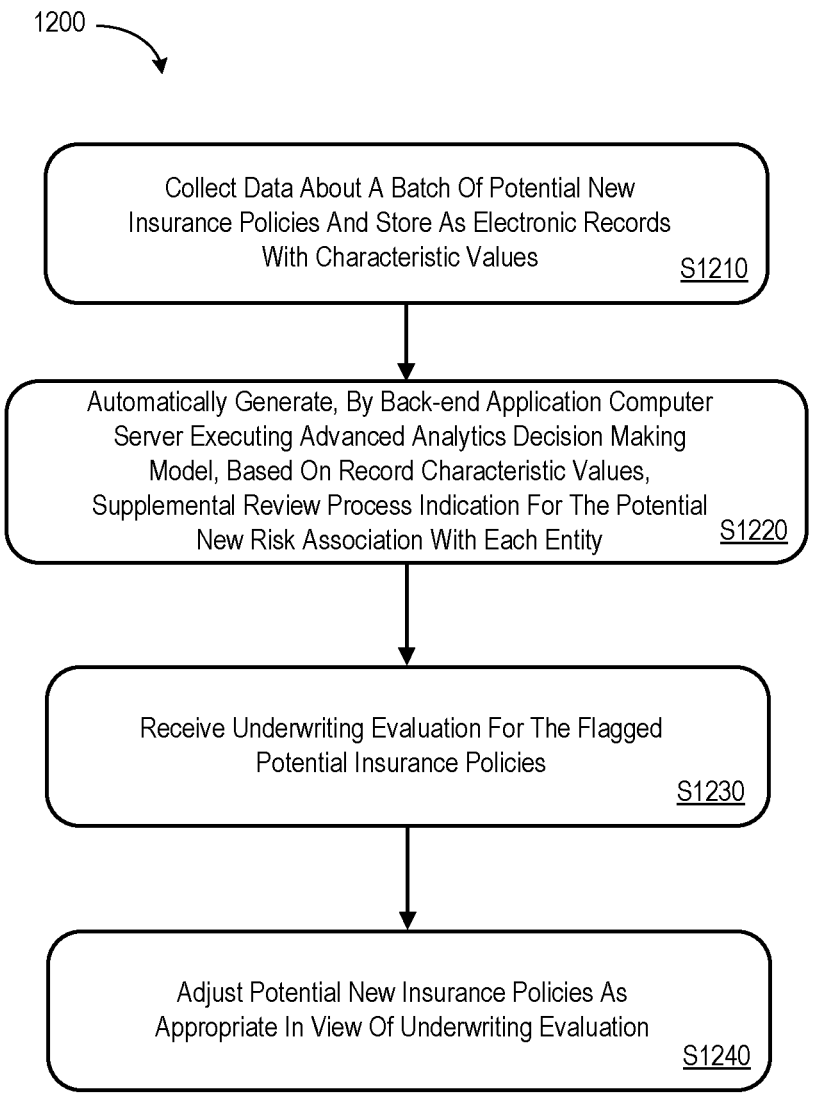
FIG. 12 illustrates an overall enterprise workflow in accordance with some embodiments.

Note that embodiments described herein might be used in connection with a number of different types of business process flows. For example, FIG. 12 illustrates an overall process 1200 in accordance with some embodiments. At S1210, information about a batch of potential insureds each having a plurality of relationships (e.g., employees), businesses, etc. may be collected during a new insurance quote process. This information might be gathered, for example, via interviews, telephone calls, web-based forms, etc. At S1220, the system may automatically generate (using, for example, any of the decision making models and/or record characteristics described herein) future performance estimation values for each of the potential insureds. Based on those future performance estimation values, the policies may undergo an underwriting review process. For example, at S1230 the underwriter may adjust one or more insurance policy parameters, such as a premium, deductible, endorsements, etc. if appropriate based on the levels of risk associated with the insured. Indications of the adjusted parameters may then be transmitted to the potential insured and the potential new insurance policies may be adjusted at S1240 (e.g., via an agent, web page, telephone call, etc.). In this way, appropriate insurance policy parameters may be assigned to a potential insurance policy as appropriate in view of an insured, industry, etc. Note that the indications of the adjusted parameters made by an underwriter might be transmitted directly to the potential insured or instead be provided via an insurance agent, a sales representative, a customer service manager, etc.

Figure 13:
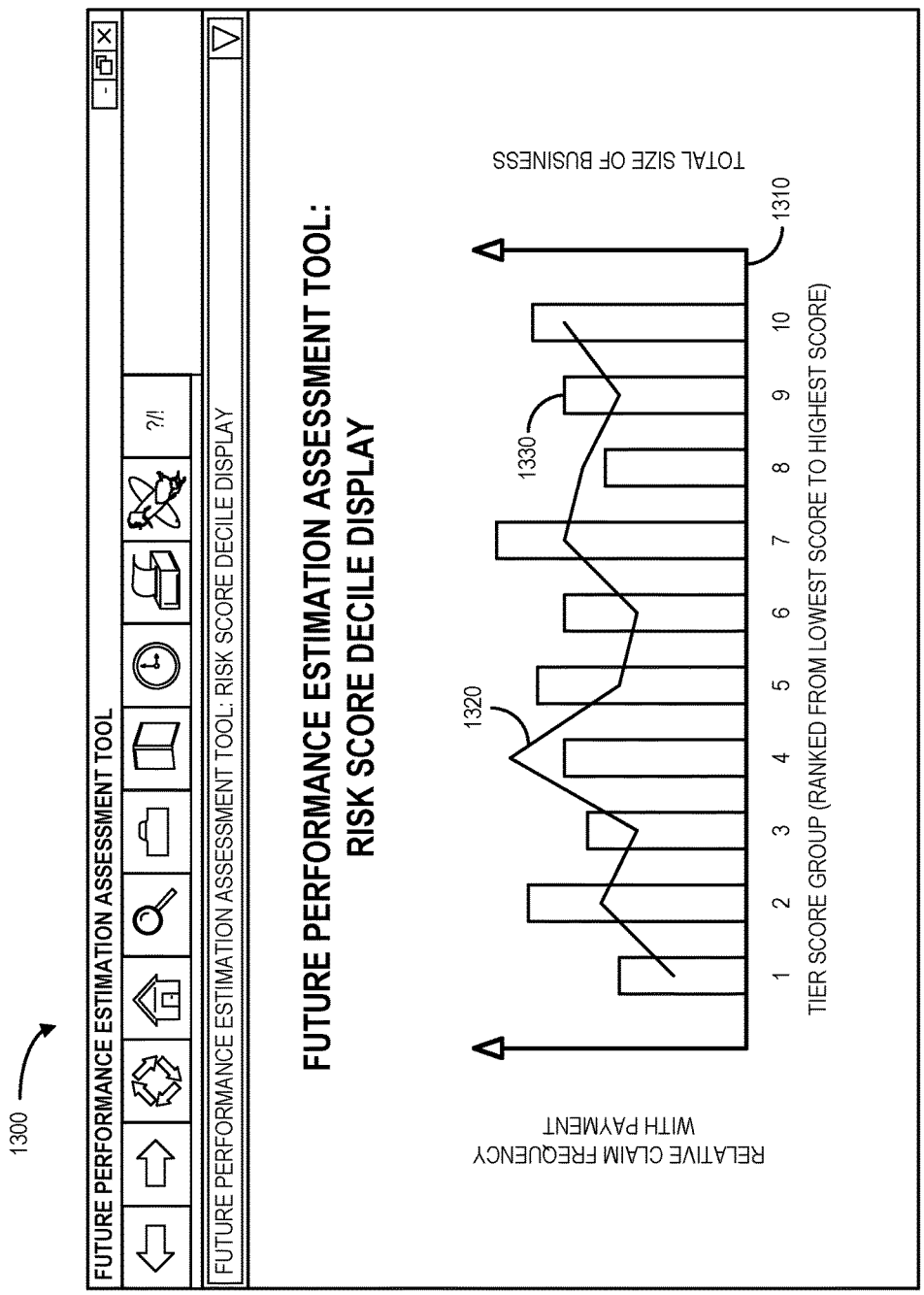
FIG. 13 is a risk score decile display according to some embodiments.

Some embodiments described herein may provide tools or displays to help ensure that a model is operating appropriately. For example, FIG. 13 illustrates a risk score decile 1300 display in accordance with some embodiments. The display includes a graph 1310 where the risk scores are divided into ten groups (decile 1 through decile 10). For each group, the relative claim with payment frequency may be charted 1320 along with a total size of business 1330 associated with that risk score group. According to some embodiments, all policies may be ranked by tier score (e.g., based on a model premium divided by an employee cost) and then grouped into ten groups of roughly equal business. A claim frequency may then be calculated for each decile. Note that this might be associated with a model premium, a manual premium, and/or a written premium. Moreover, a higher slope of the line 1320 may be associated with improved risk segmentation power. Other embodiments may be based on a relative pure premium and/or a relative loss ratio. According to some embodiments, the system may continuously (or periodically) monitor performance automatically generate an alert signal when it appears the model is not behaving appropriately, The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A system to provide a future performance estimation assessment tool for an enterprise via an automated back-end application computer server, comprising:
   (a) at least one internal data source storing data collected by the enterprise;
   (b) at least one third-party data source external to the enterprise;
   (c) a data store containing electronic records created in accordance with data from both the internal data source and the third-party data source, each electronic record representing a risk association for an entity in connection with a plurality of relationships, wherein each electronic record contains a set of record characteristic values;
   (d) the back-end application computer server, coupled to the data store, programmed to:
      (i) access the electronic records in the data store,
      (ii) automatically designate a first sub-set of the set of record characteristic values of each electronic record as fixed effect variables,
      (iii) automatically designate a second sub-set of the set of record characteristic values of each electronic record as random effect variables,
      (iv) generate, by a data analytics mixed effect predictive model based on the fixed effect variables and the random effect variables, a future performance estimation value for the risk association of each entity in connection with its plurality of relationships, and
      (v) transmit an indication associated with the future performance estimation value for the risk association of at least one entity in connection with its plurality of relationships to generate an interactive user interface display; and
   (e) a communication port coupled to the back-end application computer server to facilitate an exchange of electronic messages, via a distributed communication network, supporting the interactive user interface display, including a display of a plurality of the record characteristic values, component scores associated with those record characteristic values, and the future performance estimation value.

2. The system of claim 1, wherein the future performance estimation value is further based at least in part on: (a) a generalized linear model, and (ii) a generalized linear mixed effect model.

3. The system of claim 1, wherein the data analytics mixed effect predictive model is defined as:

$$Y=\beta+Zu+e$$

where $\beta$ represents a fixed effect intercept, u represents a random effect predictor, e represents an error term, and X and Z represent design matrices relating observations Y to $\beta$ and u, respectively.

4. The system of claim 1, wherein the future performance estimation assessment tool comprises a loss driven model calculator, and each value in the set of record characteristic value is associated with a component weighting score.

5. The system of claim 4, wherein the loss driven model outputs a predicted loss ratio.

6. The system of claim 4, wherein the component weighting scores are associated with a Weight of Evidence ("WoE") transformation.

7. The system of claim 1, wherein each entity is associated with an employer, the plurality of relationships are a plurality of employer-employee relationships, and the risk association is an employment practices liability insurance policy that policy protects the employer against claims from employees in connection with alleged wrongful acts arising from the employment process, including claims associated with: (i) discrimination, (ii) harassment, (iii) retaliation, (iv) violation of a governmental employment regulation or statute, (v) wrongful discipline, (vi) wrongful failure to promote, and (vii) wrongful termination.

8. The system of claim 7, wherein the data analytics mixed effect predictive model is associated with a generalized linear mixed effect model that has:
   insurance policy information as a fixed effect predictor model input,
   geographic metropolitan area data as a random effect predictor model input, and
   risk estimates as a model output.

9. The system of claim 7, wherein at least some of the set of record characteristic values are associated with insurance policy data, including at least one of: (i) an insurance policy length, (ii) a deductible amount, (iii) a coverage limit, and (iv) a deductible self-insured retention amount.

10. The system of claim 7, wherein at least some of the set of record characteristic values are associated with employer data, including at least one of: (i) a number of employees, (ii) a number of employees, (iii) employee turnover data, (iv) an average cost per employee by employer size, (v) industry category, (vi) a number of claims, (vii) a company financial score, (viii) one or more human resources policies that are or will be in effect, (ix) tenure data, (x) a public or private business indicator, (xi) Equal Employment Opportunity Commission ("EEOC") charges, (xii) a new business indicator, and (xiii) an amount of time in business indicator.

11. The system of claim 7, wherein at least some of the set of record characteristic values are associated with geographic data, including at least one of: (i) a country, (ii) a county, (iii) a ZIP code, (iv) a state grouping, (v) local unemployment data, (vi) local Equal Employment Opportunity Commission ("EEOC") charges, (vii) local per-capita lawyer and litigation climate data, and (viii) local census information.

12. The system of claim 7, wherein at least some of the set of record characteristic values are associated with third-party data, including at least one of: (i) a financial score, (ii) social media information, (iii) economic indicators, and (iv) macro-economic conditions.

13. The system of claim 7, wherein at least some of the set of record characteristic values are associated with other types of insurance, including at least one of: (i) workers' compensation insurance, (ii) disability insurance, and (iii) general liability insurance.

14. The system of claim 1, wherein future performance estimation values are associated with a geographic metropolitan risk analysis.

15. The system of claim 1, wherein future performance estimation values are associated with a portfolio risk flag that uses using third-party economic indicators to help monitor macro-economic conditions for risk and assess growth objectives as follows:

$$\text{Risk Flag} = w_1 * US\_LEI + w_2 * US\_CEI$$

wherein $w_1$ and $w_2$ are weighting factors, US_LEI is associated with a United States leading economic indicator and US_CEI is associated with a United States coincident economic indicator.

16. The system of claim 1, wherein each electronic record is associated with a record identifier and a communication address, and the sets of record characteristic values are collected via at least one of: (i) sending a communication to a communication address and receiving, from a party associated with an electronic record having that communication address, a response to the communication, (ii) a postal mailing automatically generated by a distribution center, (iii) a postal mailing received by the distribution center, (iv) an email automatically generated by an email server, (v) information provided a web interface, (vi) an interactive voice response system associated with a telephone call center, (vii) a chat application that interacts with a party in substantially real time, and (viii) a video link.

17. The system of claim 1, wherein, after the future performance estimation values are generated, the back-end application computer server is further to periodically monitor performance outcomes and automatically adjust the data analytics mixed effect predictive model.

18. A computerized method to provide a future performance estimation assessment tool via an automated back-end application computer server, comprising:
   accessing, by the automated back-end application computer server, a data store containing electronic records, each electronic record representing a risk association for an entity in connection with a plurality of relationships, wherein each electronic record contains a set of record characteristic values;
   automatically designating, by the back-end application computer server, a first sub-set of the set of record characteristic values of each electronic record as fixed effect variables;
   automatically designating, by the back-end application computer server, a second sub-set of the set of record characteristic values of each electronic record as random effect variables;
   generating, by a data analytics mixed effect predictive model based on the fixed effect variables and the random effect variables, a future performance estimation value for the risk association of each entity in connection with its plurality of relationships; and
   transmitting an indication associated with the future performance estimation value for the risk association of at least one entity in connection with its plurality of relationships to generate an interactive user interface display, wherein said transmitting is performed by a communication port, coupled to the back-end application computer server, that facilitates an exchange of electronic messages, via a distributed communication network, supporting the interactive user interface display.

19. A non-tangible, computer-readable medium storing instructions, that, when executed by a processor, cause the processor to perform a method to provide a future performance estimation assessment tool via an automated back-end application computer server, the method comprising:
   accessing, by the automated back-end application computer server, a data store containing electronic records, each electronic record representing a risk association for an entity in connection with a plurality of relationships, wherein each electronic record contains a set of record characteristic values;

automatically designating, by the back-end application computer server, a first sub-set of the set of record characteristic values of each electronic record as fixed effect variables;

automatically designating, by the back-end application computer server, a second sub-set of the set of record characteristic values of each electronic record as random effect variables;

generating, by a data analytics mixed effect predictive model based on the fixed effect variables and the random effect variables, a future performance estimation value for the risk association of each entity in connection with its plurality of relationships; and transmitting an indication associated with the future performance estimation value for the risk association of at least one entity in connection with its plurality of relationships to generate an interactive user interface display, wherein said transmitting is performed by a communication port, coupled to the back-end application computer server, that facilitates an exchange of electronic messages, via a distributed communication network, supporting the interactive user interface display including an automatic display of an alert signal when it is determined that the data analytics mixed effect predictive model is not generating appropriate future performance estimation values.

* * * * *